UNITED STATES PATENT OFFICE.

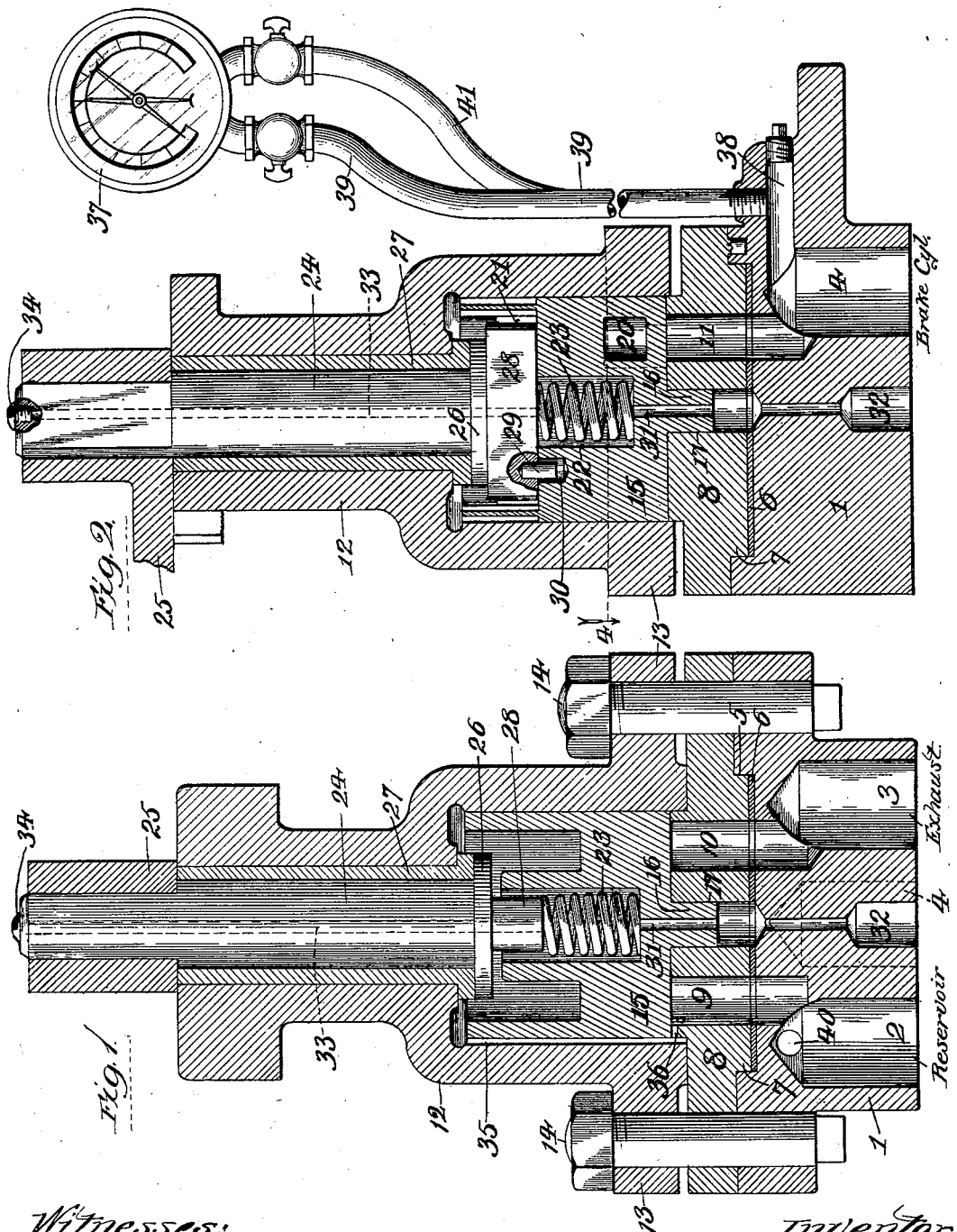

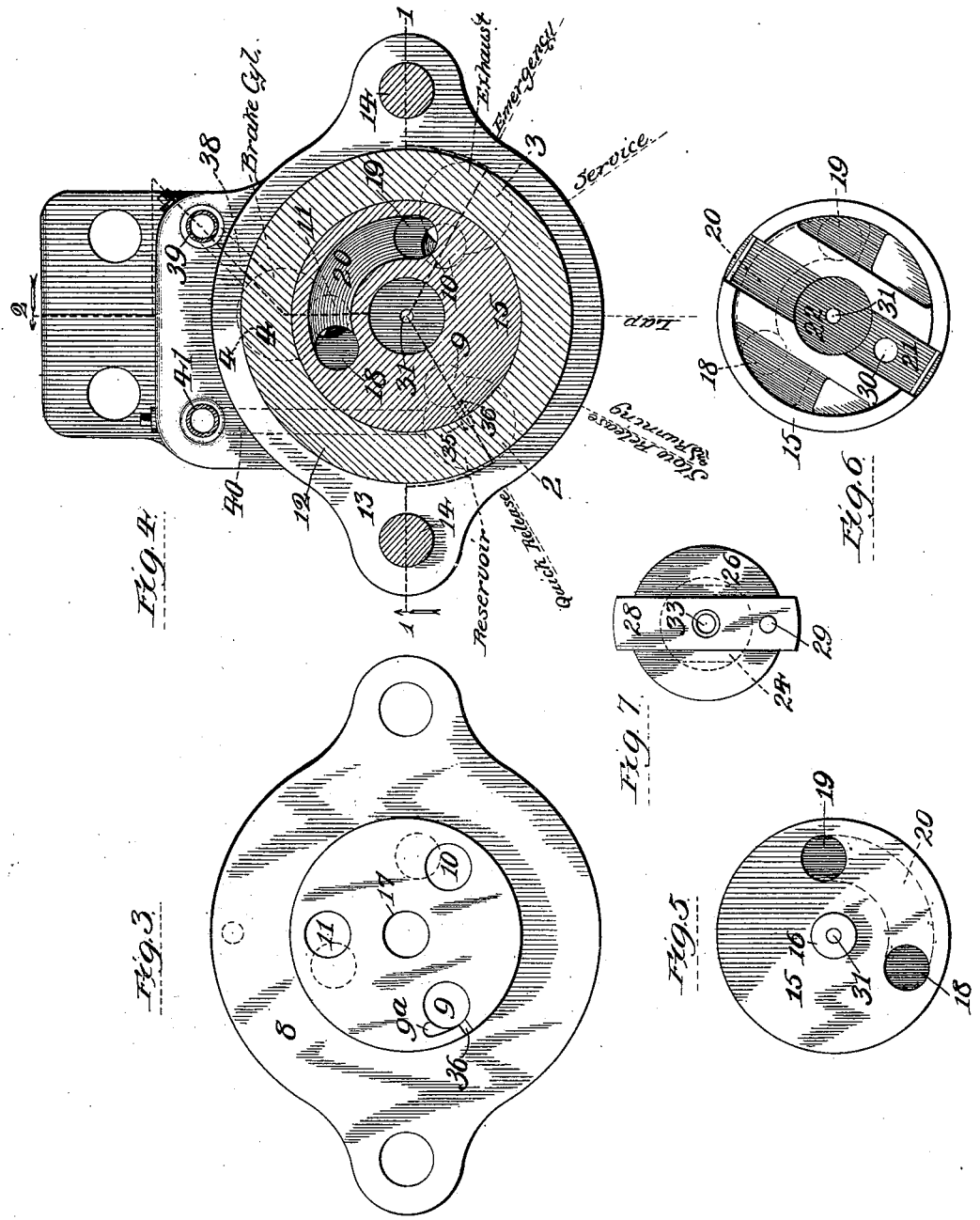

NIELS ANTON CHRISTENSEN, OF MILWAUKEE, WISCONSIN.

ENGINEER'S VALVE FOR FLUID-PRESSURE BRAKE SYSTEMS.

SPECIFICATION forming part of Letters Patent No. 646,618, dated April 3, 1900.

Application filed December 2, 1898. Serial No. 698,036. (No model.)

*To all whom it may concern:*

Be it known that I, NIELS ANTON CHRISTENSEN, residing at Milwaukee, county of Milwaukee, and State of Wisconsin, have invented certain new and useful Improvements in Engineers' Valves for Fluid-Pressure Brake Systems, of which the following is a specification.

My invention relates to fluid-pressure brake systems; and its object is to provide a simple and efficient engineer's valve for controlling the fluid under pressure either in the straight air or automatic system.

In the drawings, Figure 1 is a sectional view on the irregular line 1 of Fig. 4; Fig. 2, a sectional view on line 2 of Fig. 4; Fig. 3, a plan view of the removable valve-seat; Fig. 4, a sectional plan on line 4 of Fig. 2; Fig. 5, a bottom plan of the rotary valve; Fig. 6, a top plan thereof, and Fig. 7 a bottom plan of the operating-stem for the valve.

For convenience I will describe my valve as employed in a straight air system, although I do not intend to be understood as limiting myself thereto, as the same valve is capable of governing the connections or ports in an automatic brake system.

The head or casting 1 has a port or passage 4 leading to the train-pipe and brake-cylinder, a port 2 from the air-reservoir or other source of fluid-pressure, and also a port 3 leading to the atmosphere. Into these ports are screwed the pipes, respectively, from the train-pipe and reservoir and also, if desired, an exhaust-pipe. The head has a preferably-circular socket 5, into which is fitted a suitable gasket 6. This socket receives the flange 7 of the removable valve-seat 8, which is provided with the three ports 9, 10, and 11, registering, respectively, with the ports 2, 3, and 4.

A valve-casing 12, having flanges 13, is securely bolted or otherwise secured to the head 1 with the interposed removable valve-seat by means of the bolts 14. This casing is provided with a chamber in which rotates a valve 15, having a depending central stem 16, fitting in the socket or passage 17 in the valve-seat. The lower face of this valve may be provided with any suitable means for connecting any two of the ports, and, as shown in Fig. 5, I prefer to use two ports 18 and 19, connected by a passage 20, although a suitable recess would answer the purpose. The valve 15 is provided with a transverse slot 21, as shown more particularly in Figs. 2 and 6, and also with a socket 22 to receive a suitable spring 23. The casing 12 has a central bore, in which fits the stem 24 of the usual operating-handle 25, by which the valve is actuated. The stem has a flange 26, which bears upwardly against the casing, or, as shown in Figs. 1 and 2, against a bushing 27 in the bore. The end of the stem is also provided with a block 28, preferably rectangular in shape and adapted to fit into the slot 21, and thereby engage the valve to cause the latter to turn with it. In the lower face of this block is arranged a depending pin 29, adapted to enter a hole 30 in the valve 15. This pin serves not only to connect the parts, but to indicate when the handle and stem are properly inserted on the valve; otherwise there would be nothing to indicate the proper relative position of these parts without taking out the valve and examining the under face of the same. The spring 23 abuts at one end against the bottom of the socket 22 and at the other end against the bottom or lower end of the operating-stem, whereby the flange and its stem are held in proper relative position and prevented from having any loose motion or play in the casing.

The valve 15 is preferably provided with a drip or drain opening 31, extending centrally and communicating with the socket 17 and passage 32 and with the atmosphere through any ordinary and well-known drain-cock. (Not shown.) The purpose of these passages is to drain away any moisture or other foreign matter that may collect in the spring-socket of the valve.

Moisture is liable to collect and in cold weather to freeze around valves of this nature, and to prevent the same I provide the inner wall of the casing with a vertical groove or score 35, as seen particularly in Fig. 1. This groove communicates with and drains into the ports 9 and 2 through a branch passage 36. There is sufficient clearance between the side of the valve and the inner wall of the casing to permit any water or moisture therein to pass or creep around to the groove or score, which is of substantially the same height as the valve. The moisture can thus be drained out, and all liability of the freezing of the valve is avoided.

As shown in the drawings, the rotary valve 15 is of substantially the same diameter as the chamber and fits closely but operatively therein. It is obvious that moisture, which is liable to collect or form between the valve and the walls of the chamber, will be forced or carried around the valve, owing to the closeness of fit, until such moisture or water finds exit through the score or channel 35. While the score permits a small flow of air to maintain an equilibrium on the two sides or faces of the valve, it is not used as a port or passage for the air in the operation of the brakes, inasmuch as all the work is done on the lower face of the valve. Consequently in my construction there is no flow of air to retard or interrupt the drainage of the valve device, so that it is always in operative condition regardless of any exposed position or of the length of interim of its actual working.

In assembling the parts the head 1 is coupled or screwed to the respective pipes or connections, and the valve-seat is then placed in position, together with the valve 15, with its spring. The stem 24 is inserted in the bore of the casing, and the latter is then placed in position with the block 28 entering the slot 21 and the pin 29 entering the hole 30. All the parts are thereupon bolted together and the operating-handle attached. As shown particularly in Figs. 1 and 2, I prefer to provide the operating-stem with an oil-hole 33, extending longitudinally therethrough and closed at its top by means of a screw 34 or by any other suitable means. Sufficient oil is supplied through the oil-hole 33 to fill the passage 32 and the socket 17, so that the oil will feed up by capillary attraction between the outer sides of the stem 16 and the socket and between the valve and its seat.

I prefer to provide the port 9 with a small communicating groove $9^a$, so that an easy graduated admission of pressure may be obtained when the valve is working in a straight air system. When the valve is working in an automatic system, this small groove will permit a gradual and gentle reduction of train-pipe pressure for service-work.

As shown in Fig. 2, which is somewhat diagrammatic as respects the system of piping, the ordinary pressure-gage 37 may be connected with my system. The brake-cylinder port or passage 4 is connected with a port or passage 38, which communicates with the gage through pipe 39. The reservoir-port 2 is likewise connected to the gage through port or passage 40 and pipe 41.

In actual service it is frequently necessary to take an engineer's valve apart for the purpose of cleaning and oiling the mechanism or grinding and fitting the valves and seats. In my form of valve this can be easily done simply by removing the bolts, thereby permitting the casing and the valve-seat to be removed. In this operation it is entirely unnecessary to remove or in any wise disturb any of the pipe connections, which would be the case where the valve-seat was not removable, but was attached securely to or formed as a part of the casing or member which was coupled directly to the pipe connections.

In Fig. 4 of the drawings I have shown and indicated the position of the operating-handle. The figures of the drawings show the operating-stem in slow release or running position, in which the ports 18 and 19 in the rotary valve partially register, respectively, with the release or exhaust port 10 and the train-pipe or brake-cylinder port 11, (see Figs. 3 and 4,) in which case the brakes are released. For a quick release the handle is brought to the position marked "Quick release," whereby full register is obtained between these ports. In lap position the ports 18 and 19 do not register with any of the ports in the valve-seat. When the handle is turned to the position marked "Service stop," the ports 18 and 19, respectively, will partially register with the ports 9 and 11, respectively, the groove $9^a$ allowing sufficient fluid under pressure to flow from the reservoir to the train-pipe and brake-cylinder, which has, of course, been cut off from the atmosphere. This groove permits a gentle application of the brakes, and the pressure can be increased in the brake-cylinder by further rotation of the valve. In a full service or emergency stop the handle is turned still further to the right, Fig. 4, whereupon the last-named ports will be in full register.

While I have herein shown and described my valve as employed in a straight air system, it will be understood that it is equally applicable for use in the automatic air system with simple and obvious changes in the connections or position of the valve. For instance, the connections with the head may be changed so that the exhaust-port and the reservoir-port will be reversed—that is, the reservoir-port in the straight air system becomes the exhaust-port in the automatic air system and the exhaust-port in the straight air system becomes the main air-reservoir port in the automatic air system, the train-pipe or brake-cylinder connection of the straight air system being the train-pipe connection proper in the automatic air system, or the valve 15 may be turned one hundred and eighty degrees, or, if desired, the ports 18 and 19 may be located on the opposite side of the valve. In case the engineer's valve is used in the automatic air system the air is fed from the main reservoir to the train-pipe and auxiliary reservoirs in running position, and the brakes are applied by reducing the train-pipe pressure in the usual and well-known manner familiar to those skilled in this particular art. In the automatic system the groove $9^a$ will be found useful in giving sufficient range of movement in gently reducing the train-pipe pressure without danger of causing an emergency reduction.

I claim—

1. An engineer's valve for fluid-pressure brake systems comprising a head having ports communicating with the air-brake system and with the atmosphere, a removable valve-seat having ports communicating with said first-named ports and also having a central opening passing therethrough, a rotary valve governing such ports and having a depending stem received by the said central opening and provided with a passage communicating with said opening and means for operating the valve, said head having a valve-governed drain-passage communicating with said central opening in the valve-seat.

2. An engineer's valve comprising a seat having ports communicating with the brake system and with the atmosphere, a rotary valve having on its under face port-connecting means for governing said ports and having a transverse slot and a central socket and also a hole at one side of the socket, an operating-stem having a rectangular end engaging in the slot and a pin arranged upon the end of the stem and entering said hole.

3. An engineer's valve comprising a casing having ports communicating with the brake system and the atmosphere, and also having a central valve-governed drain-opening, a rotary valve governing said ports and having a central drain-opening communicating with the opening in the casing and means for rotating the valve.

4. An engineer's valve comprising a casing having ports communicating with the brake system and the atmosphere and also having a chamber, and a cylindrical valve fitting closely but operatively in said chamber and having port-connecting means on its lower face for performing all the functions, such chamber having a substantially-vertical score on its inner wall along the entire height of the valve, which score communicates with one of said ports.

5. An engineer's valve comprising a casing having ports communicating with the brake system and the atmosphere, and also having a cylindrical chamber, a rotary cylindrical valve of the same diameter as said chamber and having port-connecting means on its lower face for performing all the functions, such chamber having a substantially-vertical score on its inner wall adjacent to said valve and of the same height as the valve, and a passage communicating between said score and one of said ports.

6. An engineer's valve comprising a casing having ports 9, 10 and 11 communicating with the brake system and the atmosphere and having a cylindrical chamber, a cylindrical rotary valve 15 governing said ports and of the same diameter as the chamber to fit closely but operatively therein, said valve performing all the functions on its lower face, such casing having a score 35 extending substantially vertically on its its inner wall and along the entire side of the valve and a passage 36 communicating with port 9 whereby moisture is drained from the casing and the valve prevented from becoming frozen.

7. An engineer's valve comprising a head 1 having ports 2, 3 and 4 communicating with the brake system and atmosphere, a removable valve-seat 8 having ports 9, 10 and 11 communicating with ports 2, 3 and 4 respectively and having a groove 9ª for port 9, a valve-casing connected to the head and seat, a rotary valve 15 therein having on its under face ports 18 and 19 for governing all said ports 9, 10 and 11 and an operating-shaft 25 for the valve.

8. An engineer's valve comprising a seat having ports communicating with the brake system and the atmosphere and having a central drain-opening, a rotary valve governing said ports and having a depending stem entering said opening, said valve and its stem having an opening communicating with said opening in the seat and means for rotating the valve.

9. An engineer's valve comprising a head 1, a removable seat 8 having ports 9, 10 and 11, a rotary valve 15 having ports 18 and 19 connected by passage 20 and having a transverse slot 21 and socket 22 in its top, a stem 24 engaging the valve, a valve-casing 12 and means for securing together the head and casing and the interposed seat.

10. An engineer's valve comprising a head 1, a removable valve-seat 8 having ports 9, 10 and 11, and also a central opening 17, a rotary valve 15 having ports 18 and 19 and a slot 21 and socket 22 in its top, a depending stem 16 upon the valve entering the opening 17, such valve also having a passage 31 communicating with the socket and opening 17, an operating-stem 24 having an end 28 engaging in the slot, a spring 23 in the socket, a casing 12 and means for securing the head, casing and seat together.

NIELS ANTON CHRISTENSEN.

Witnesses:
SAMUEL E. HIBBEN,
LOUISE SERAGE.